(12) United States Patent
Kometani et al.

(10) Patent No.: US 6,424,073 B1
(45) Date of Patent: Jul. 23, 2002

(54) ALTERNATOR

(75) Inventors: Haruyuki Kometani; Yoshihito Asao; Katsumi Adachi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 30 days.

(21) Appl. No.: 09/665,282

(22) Filed: Sep. 20, 2000

(30) Foreign Application Priority Data

Feb. 29, 2000 (JP) ........................................ 2000-055021

(51) Int. Cl.$^7$ .............................................. H02K 19/22
(52) U.S. Cl. ........................ 310/263; 310/180; 310/254; 310/179
(58) Field of Search ................................ 310/180, 263, 310/179, 184, 185, 206, 207, 198, 254, 201

(56) References Cited

U.S. PATENT DOCUMENTS

| | | | |
|---|---|---|---|
| 4,700,098 A | | 10/1987 | Kawashima |
| 4,710,661 A | * | 12/1987 | Gjota ........................... 310/198 |
| 5,270,605 A | | 12/1993 | LeFrancois et al. |
| 5,708,316 A | * | 1/1998 | Ishida .......................... 310/184 |
| 6,166,471 A | * | 12/2000 | Kometani et al. ........... 310/198 |
| 6,288,471 B1 | * | 8/2001 | Kometani et al. ........... 310/254 |

FOREIGN PATENT DOCUMENTS

| | | | |
|---|---|---|---|
| EP | 0 881 752 | 12/1998 | |
| EP | 0 977 342 | 2/2000 | |
| GB | 887 047 | 1/1962 | |
| JP | 4-26345 | 1/1992 | .......... H02K/19/22 |

OTHER PUBLICATIONS

Patent Abstracts of Japan vol. 016, No. 192 (E–1199), May 11, 1992 & JP 04 026345.
Patent Abstracts of Japan vol. 007, No. 226 (E–202), Oct. 7, 1983 & JP 58 116031.
Patent Abstracts of Japan vol. 010, No. 197 (E–418), Jul. 10, 1986 & JP 61 042258.

* cited by examiner

Primary Examiner—Burton S. Mullins
(74) Attorney, Agent, or Firm—Sughrue Mion, PLLC

(57) ABSTRACT

An automotive alternator is capable of reducing electromagnetic noises and wind noises of 12f components, which are extremely unpleasant higher harmonic noises to the ears, thereby permitting uncomfortable noises to be reduced, and also capable of suppressing a drop in output caused by a phase difference. In the alternator, two slots are applied per pole in a phase, spaces between centerlines that extend in a radial direction of openings of adjoining slots are formed to be irregular, and a first three-phase stator winding and a second three-phase stator winding are wound around a stator core with a phase difference of an electrical angle ranging from 31 to 34 degrees.

7 Claims, 13 Drawing Sheets

STATOR MAGNETOMOTIVE FORCE HIGHER HARMONIC EQUAL 30° PITCHES

ELECTOROMAGNETIC EXCITING FORCE HIGHER HARMONIC

ALTERNATOR

BACKGROUND OF THE INVENTION

1. Field of the Invention

The present invention relates to an alternator in which alternating voltage is generated in a stator by rotation of a rotor.

2. Description of the Related Art

In recent years, there has been an increasing demand for an automotive alternator that generates more power because of increasing vehicular load, whereas a mounting space therefore is decreasing because of a trend toward a smaller vehicular engine room.

In addition, there has been another increasing demand for reduced noises both inside and outside a vehicle, and engine noises are being decreased to respond to such a demand. A noise of an automotive alternator, which constantly operates to generate power to supply electrical load to a vehicle, has been a problem to be solved in achieving reduced noises. In the automotive alternator rotationally driven over a relatively wide revolution region from low speed to high speed, a wind noise or an electromagnetic noise thereof has been a topic to be tackled. Especially high-frequency wind noises or electromagnetic noises in a low engine speed region to a normal working region have been posing a problem because they sound particularly uncomfortable to the ears, having different frequencies from those of noises of other engine or engine accessories.

FIG. 14 is a sectional view of a conventional automotive alternator (hereinafter referred to simply as "alternator"), FIG. 15 is a perspective view of a rotor of FIG. 14, FIG. 16 shows a stator of FIG. 14 (a lead wire and a neutral wire of a stator winding are not shown), and FIG. 17 is an electrical circuit diagram of the alternator of FIG. 14.

The alternator includes: a case 3 composed of an aluminum front bracket 1 and an aluminum rear bracket 2; a shaft 6 rotatably disposed in the case 3 and which has a pulley 4 secured to one end thereof; a Lundell-type rotor 7 secured to the shaft 6; fans 5 secured to both axial ends of the rotor 7; a stator 8 secured to an inner wall of the case 3; a slip ring 9 secured to the other end of the shaft 6 and which supplies electric current to the rotor 7; a brush 10 that slides in contact with the slip ring 9; a brush holder 11 accommodating the brush 10; a first rectifier 12a and a second rectifier 12b electrically connected to the stator 8 to convert alternating current generated in the stator 8 into direct current; a heat sink 17 fitted on the brush holder; and a regulator 18 adhesively fastened to the heat sink 17 and which adjusts a magnitude of an alternating voltage generated in the stator 8.

The rotor 7 is equipped with a field winding 13 for generating magnetic flux by passing an electric current, and a pole core 51 covering the field winding 13 in which magnetic poles are produced by the magnetic flux. The pole core 51 has a pair of a first pole core assembly 20 and a second pole core assembly 21 that intermesh with each other. The first pole core assembly 20 and the second pole core assembly 21 are made of iron and have claw-shaped magnetic poles 22 and 23 at their ends. Spaces 50 are formed between adjacent claw-shaped magnetic poles 22 and 23 to prevent magnetic flux from leaking from between the claw-shaped magnetic poles 22 and 23, and also to function as cooling passages for cooling the field winding 13.

The stator 8 is provided with a stator core 15 and a stator winding 16. The stator winding 16 has two windings, namely, a first three-phase stator winding 52 and a second three-phase stator winding 53, in which conductors are wound onto the stator core 15 with a phase difference of a 30-degree electrical angle.

The stator core 15 shown in FIG. 18 is formed by punching steel sheet into a comb-like plate with equidistantly arranged teeth, and by winding or laminating the comb-like plate into an annular shape. The stator core 15 has an annular core back 55, and a plurality of teeth 54 in which a plurality of slots 15a and openings 15b are formed, the slots 15a and the openings 15b radially extending inward from the core back 55 and being disposed equidistantly in a circumferential direction.

In this example, the stator core 15 includes the two windings, namely, the first three-phase stator winding 52 and the second three-phase stator winding 53, and the rotor 7 has sixteen magnetic poles with two three-phase portions corresponding to each pole. There are 96 slots 15a, openings 15b, and teeth 54, which are formed at regular pitches of 3.75-degree mechanical angles.

The first three-phase stator winding 52 and the second three-phase stator winding 53 have a front coil end 16a and a rear coil end 16b respectively projecting from both end surfaces of the stator core 15. The coil ends 16a and 16b are composed of a plurality of extending portions 30a, which are heat radiating portions. The extending portions 30a having the same shape are arranged orderly in a circumferential direction in two rows apart from each other in a radial direction.

FIG. 19 shows a winding structure of a stator winding 56 for one phase of the three-phase stator windings 52 and 53. In the drawing, dark dots in circles in the slots 15a of the stator 15 denote conductors 30 that extend from the front bracket 1 to the rear bracket 2, and cross marks (x) in the circles in the slots 15a of the stator 15 denote the conductors 30 that extend from the rear bracket 2 to the front bracket 1.

The stator winding 56 for the one phase is formed of the copper conductors 30, each of which has its outer surface coated with enamel. The conductors 30 of the first three-phase stator winding 52 are wave-wound at every six slots from slot No. 1 to slot No. 91. In each slot 15a, the conductors 30 are radially arranged in four layers in one row. In the stator windings for the remaining two phases of the first three-phase stator winding 52, the conductors 30 are wave-wound at every six slots from slot Nos. 3 to 93, and slot Nos. 5 to 95, respectively, and the conductors 30 are radially arranged in four layers in one row in each slot 15a.

The conductors 30 of the second three-phase stator winding 53 are wave-wound at every six slots from slot No. 2 to slot No. 92. In each slot 15a, the conductors 30 are radially arranged in four layers in one row. In the stator windings for the remaining two phases of the second three-phase stator winding 53, the conductors 30 are wave-wound at every six slots from slot Nos. 4 to 94, and slot Nos. 6 to 96, respectively, and the conductors 30 are radially arranged in four layers in one row in each slot 15a.

Furthermore, as shown in FIG. 17, the stator windings 56 for the three phases are star-connected to form the first three-phase stator winding 52, and the additional stator windings 56 for the three phases are also star-connected to form the second three-phase stator winding 53. The three-phase stator windings 52 and 53 are provided in the slots 15a with a phase difference of a 30-degree electrical angle from each other, and are electrically connected to the first rectifier 12a and the second rectifier 12b, respectively. Direct current outputs of the rectifiers 12a and 12b are connected in parallel and combined.

In an automotive alternator of the above construction, current is supplied by a battery (not shown) through the brush 10 and slip ring 9 to the field winding 13 so as to generate magnetic flux, whereby the claw-shaped magnetic poles 22 of the first pole core assembly 20 are polarized with north-seeking (N) poles, while the claw-shaped magnetic poles 23 of the second pole core assembly 21 are polarized with south-seeking (S) poles.

The pulley 4 is rotated by an engine, and the rotor 7 rotates together with the shaft 6. This causes a rotating magnetic field to be imparted to the three-phase stator windings 52 and 53, and an electromotive force is generated. The alternating electromotive force is converted into direct current by means of the rectifiers 12a and 12b, a magnitude thereof is adjusted by the regulator 18, and the battery is recharged.

In the automotive alternator having the construction described above, there are two slots per pole per phase, the first three-phase stator winding 52 and the second three-phase stator winding 53 are incorporated in the stator core 15 with the 30-degree electrical phase difference, and measures against output surges are provided. Similar technical contents are disclosed in Japanese Unexamined Patent Publication No. HEI4-26345.

However, in the automotive alternator having the above construction, a magnetic attractive force is produced between the rotor 7 and the stator 8 during power generation because of an interaction between a rotating magnetic field including higher harmonics produced by the claw-shaped magnetic poles 22 and 23 of the rotor 7 and an alternating magnetic field including higher harmonics generated from alternating current produced at the stator winding 16, and an interaction between a rotating magnetic field including higher harmonics generated from the claw-shaped magnetic poles 22 and 23 of the rotor 7, and permeance higher harmonics generated by the stator slots 15a. The electromagnetic attractive force leads to an electromagnetic exciting force of the claw-shaped magnetic poles 22 and 23 of the rotor 7 and the stator core 15, with consequent occurrence of vibrations and electromagnetic noises.

Reducing the vibrations and noises requires the electromagnetic exciting force be reduced. For this purpose, it is important to reduce a magnetomotive force higher harmonics and slot higher harmonics produced in the stator 8. It is particularly important to reduce fifth, seventh, eleventh, and thirteenth higher harmonics, which are large among the magnetomotive force higher harmonics of the stator 8, and the eleventh and thirteenth higher harmonics, which are large in the slot higher harmonics.

In the automotive alternator of the above construction, as will be discussed hereinafter, when a basic frequency of output current is denoted as f, it is possible to reduce a sixth higher harmonic component of a 6f frequency. However, a twelfth component is large, and there are two slots 15a per pole in a phase; therefore, the twelfth component of a rotor magnetomotive force higher harmonic agrees with the number of the slots 15a, so that electromagnetic noises due to stator slot higher harmonics accordingly increase. Furthermore, air interference noises corresponding to a 12f frequency caused by the slots 15a are increased, and the wind noises and the electromagnetic noises interfere with each other, producing uncomfortable noises. The 12f-component noise, in particular, corresponds to a 96th component if the rotor 7 has sixteen poles when it is converted into a rotational order ratio of a number of revolutions. Thus, in a range of number of revolutions from 2000 to 6000 rpm of the automotive alternator, which corresponds to an engine speed in a range from idling speed to a normal speed, noises reach a range of frequencies from 3.2 kHz to 9.6 kHz when the rotor 7 has, for example, sixteen poles. This frequency range covers a high-frequency band of 2 to 10 kHz, to which the ears are most sensitive, posing a problem in that the noises are extremely unpleasant to passengers.

SUMMARY OF THE INVENTION

The present invention aims to solve the problem set forth above, and an object of the present invention is to provide an alternator capable of reducing unpleasant high-frequency noises.

To this end, according to one aspect of the present invention, there is provided an alternator in which irregular intervals are provided between centerlines extending in a radial direction of openings of adjoining slots, and a first three-phase stator winding and a second three-phase stator winding are wound around a stator core with a phase difference of an electrical angle of 31 to 34 degrees.

In a preferred form of the alternator in accordance with the present invention, a circumferential width of a tooth is set such that both ends of a tooth located between adjoining claw-shaped magnetic poles overlap proximal ends of the two claw-shaped magnetic poles, as observed from a radial direction.

In another preferred form of the alternator in accordance with the present invention, side surfaces of the claw-shaped magnetic poles have chamfered portions.

In yet another preferred form of the alternator in accordance with the present invention, the three-phase stator windings have star connections, and neutral points of the star connections are electrically connected to rectifiers for rectifying ac output.

In a further preferred form of the alternator in accordance with the present invention, circumferential widths of the openings of the slots are regular, while circumferential widths of distal ends of adjoining teeth are irregular.

In a further preferred form of the alternator in accordance with the present invention, circumferential widths of the openings of adjoining slots are irregular, while circumferential widths of distal ends of the teeth are regular.

In a further preferred form of the alternator in accordance with the present invention, the first three-phase stator winding and the second three-phase stator winding are wound around the stator core with a phase difference of an electrical angle of 32.5 degrees.

DESCRIPTION OF THE PREFERRED EMBODIMENTS

Figure 1:
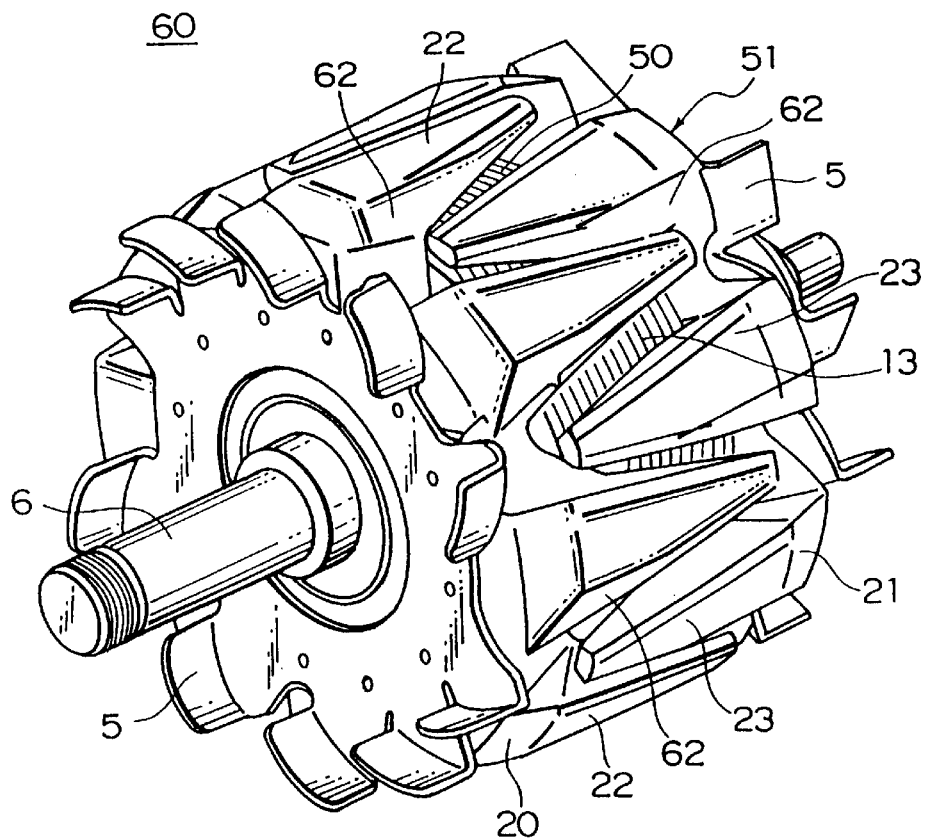
FIG. 1 is a perspective view of a rotor of an automotive alternator in accordance with First Embodiment of the present invention.

The following will describe embodiments of an alternator in accordance with the present invention. Like or equivalent components will be assigned like reference numerals in descriptions thereof.

First Embodiment

Figure 2:
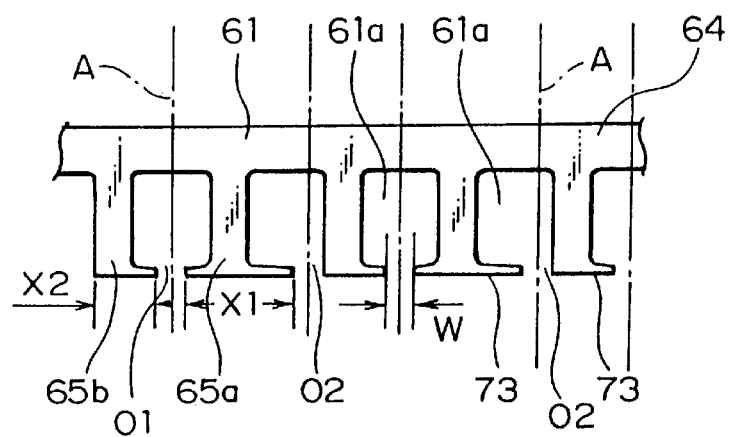
FIG. 2 is a diagram illustrating, in a flattened fashion, an essential section of a stator core of the automotive alternator in accordance with First Embodiment of the present invention.
Figure 3:
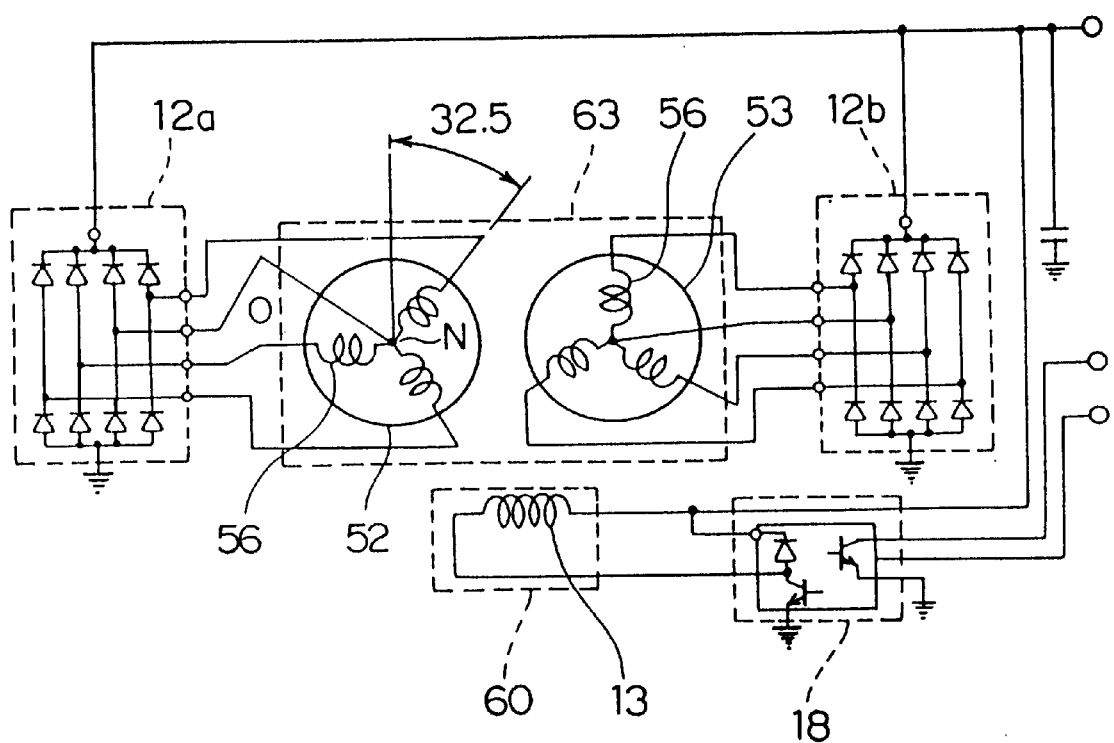
FIG. 3 is an electrical circuit diagram of the automotive alternator in accordance with First Embodiment of the present invention.
Figure 4:
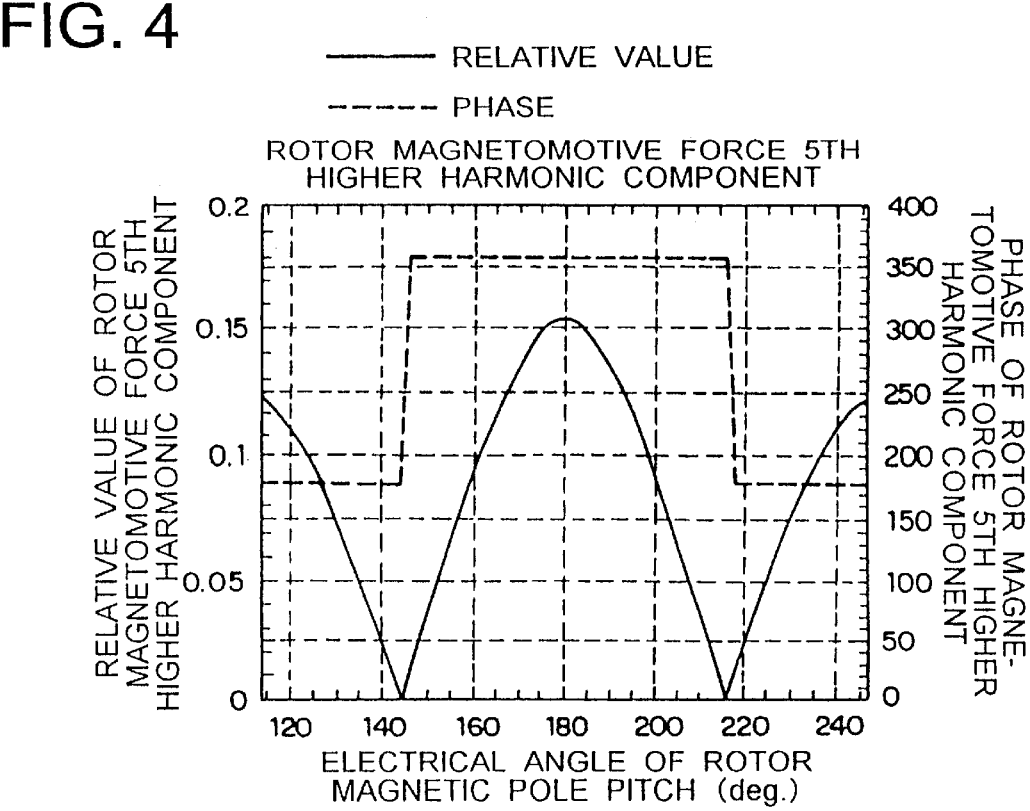
FIG. 4 is a diagram showing changes in a fifth higher harmonic component of a magnetomotive force of the rotor.
Figure 5:
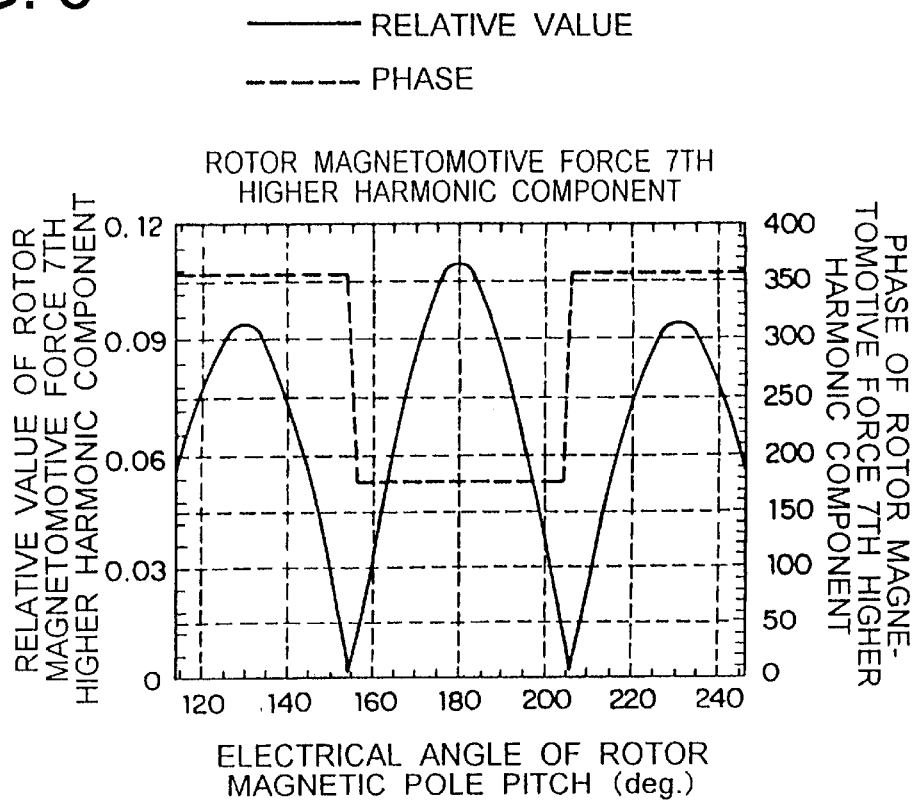
FIG. 5 is a diagram showing changes in a seventh higher harmonic component of the magnetomotive force of the rotor.
Figure 6:
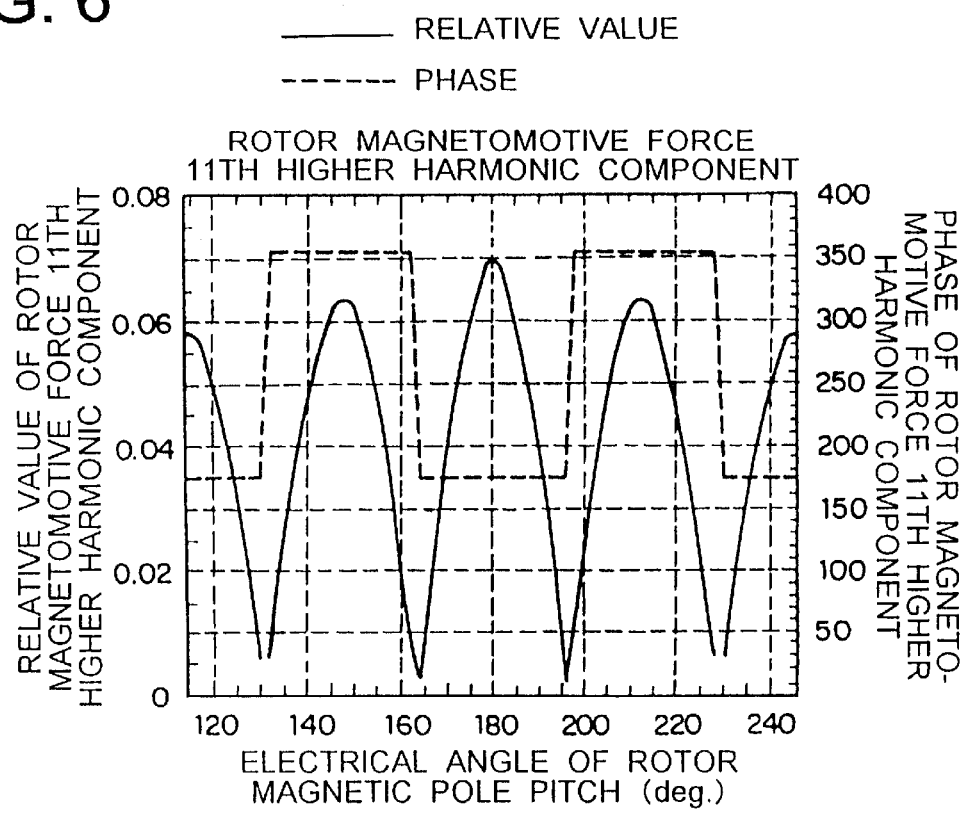
FIG. 6 is a diagram showing changes in an eleventh higher harmonic component of the magnetomotive force of the rotor.
Figure 7:
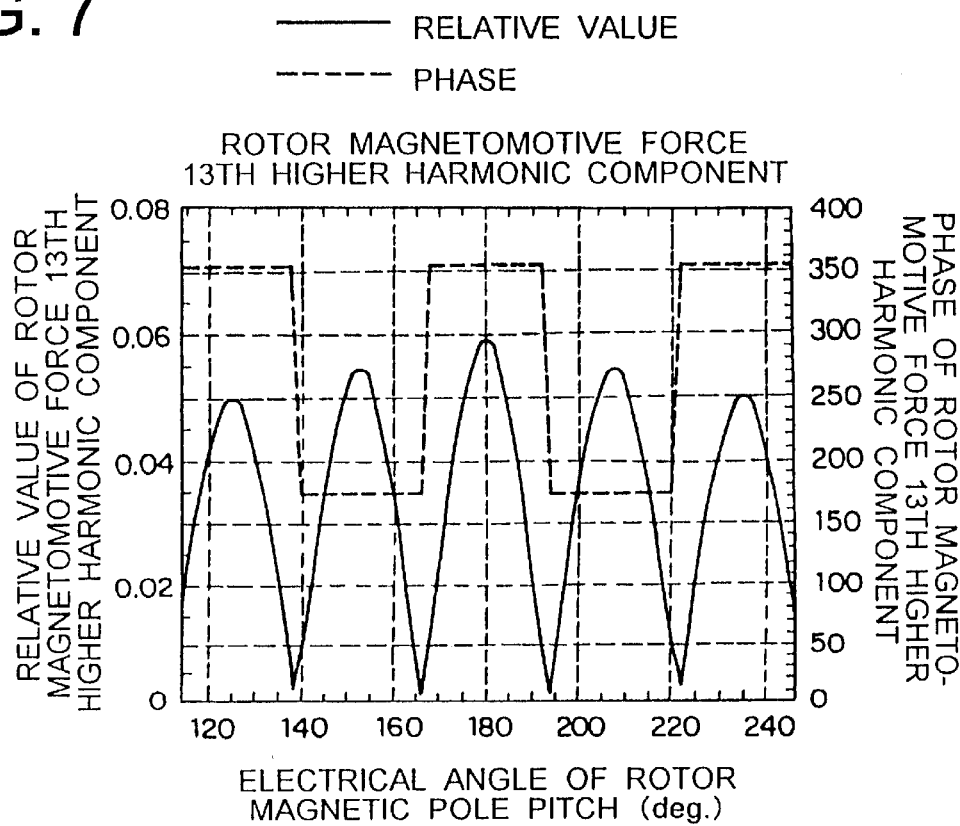
FIG. 7 is a diagram showing changes in a thirteenth higher harmonic component of the magnetomotive force of the rotor.

FIG. 1 is a perspective view of a rotor 60 of an automotive alternator in accordance with First Embodiment of the present invention, FIG. 2 is an explanatory diagram showing, in a flattened fashion, a stator core 61 of a stator of the automotive alternator, and FIG. 3 is an electrical circuit diagram of the automotive alternator.

The rotor 60 is equipped with a field winding 13 for generating magnetic flux on passage of electric current, and a pole core 51 covering the field winding 13 in which magnetic poles are produced by the magnetic flux. The pole core 51 has a pair of a first pole core assembly 20 and a second pole core assembly 21 that intermesh with each other. The first pole core assembly 20 and the second pole core assembly 21 are made of iron, and have claw-shaped magnetic poles 22 and 23 at their ends. Spaces 50 are formed between adjacent claw-shaped magnetic poles 22 and 23 to prevent magnetic flux from leaking from between the claw-shaped magnetic poles 22 and 23, and also to function as cooling passages for cooling the field winding 13. Chamfered portions 62 are formed at proximal ends of side surfaces in a rotational direction of the claw-shaped magnetic poles 22 and 23.

The stator 63 is provided with a stator core 61 and a stator winding 16. The stator winding 16 has two windings, namely, a first three-phase stator winding 52 and a second three-phase stator winding 53 in which conductors are wound onto the stator core 15 with a phase difference of 32.5-degree electrical angle.

The stator core 61 is formed by punching steel sheets into a comb shape with equidistantly arranged teeth, and by winding or laminating the comb-shaped plate into an annular shape. The stator core 61 has an annular core back 64, teeth 65a and 65b radially extending inward from the core back 64.

Slots 61a, each of which has the teeth 65a and 65b, are arranged at equal pitches. Lengths in a circumferential direction of flanges 73 at distal ends of adjoining teeth 65a and 65b are varied so as to provide irregular intervals between centerlines A that extend in a radial direction of openings O1 and O2 of the slot 61a. The stator core 61 has 48 slots 61a of mechanical angles of (4.06°–3.44°) and the openings O1 and O2.

The stator core 61 includes two sets of stator windings, namely, the first three-phase stator winding 52 and the second three-phase stator winding 53 with a phase difference of 32.5-degree electrical angle. The rotor 60 has sixteen magnetic poles, one pole covering 2×3 phases.

The first three-phase stator winding 52 and the second stator winding 53 are star-connected. Neutral points N of the star connections are electrically connected to the rectifiers 12a and 12b that rectify ac outputs.

The first rectifier 12a for rectifying an ac output from the first stator winding 52 is electrically connected to the first stator winding 52, while the second rectifier 12b for rectifying an ac output from the second stator winding 53 is electrically connected to the second stator winding 53. The outputs of the two stator windings are rectified and then combined.

In the stator core 61 of the automotive alternator having the construction described above, the intervals between the centerlines A extending in the radial direction of the openings O1 and O2 of the slots 61a are irregular, and the first three-phase stator winding 52 and the second three-phase stator winding 53 are installed with the phase difference of the 32.5-degree electrical angle.

The reasons for the above construction will now be described.

During power generation, a magnetic attractive force is produced between the rotor 60 and the stator 63 because of an interaction between a rotating magnetic field including higher harmonics produced by the claw-shaped magnetic poles 22 and 23 of the rotor 60 and an alternating magnetic field including higher harmonics generated from alternating current produced at a stator winding 16. The electromagnetic attractive force leads to an electromagnetic exciting force of the claw-shaped magnetic poles 22 and 23 and the stator core 61 of the rotor 60, causing vibrations and electromagnetic noises.

The inventor of the application concerned has analyzed the electromagnetic exciting force from a viewpoint of electromagnetic field. The analysis has been carried out, using an automotive alternator that has two three-phase stator windings arranged in parallel and six times as many stator slots as poles.

Electromagnetic noises in the automotive alternator are attributable to electromagnetic exciting forces of three-fold and six-fold orders of the number of poles per revolution. More specifically, when a basic frequency of output current is denoted as f, the electromagnetic noises are caused by electromagnetic exciting forces of a 6f frequency and a 12f frequency. The electromagnetic exciting force of the 6f frequency is produced by the following interactions:

(a) An interaction between a fifth spatial higher harmonic of a magnetomotive higher harmonic of the rotor and the fifth spatial higher harmonic of a magnetomotive higher harmonic of the stator.

(b) An interaction between a seventh spatial higher harmonic of the magnetomotive higher harmonic of the rotor and the seventh spatial higher harmonic of the magnetomotive higher harmonic of the stator.

(c) An interaction between fifth and seventh spatial higher harmonics of the magnetomotive higher harmonic of the rotor and a sixth spatial higher harmonic of a stator slot higher harmonic.

The electromagnetic exciting force of the 12f frequency is produced by the following interactions:

(d) An interaction between an eleventh spatial higher harmonic of the magnetomotive higher harmonic of the rotor and the eleventh spatial higher harmonic of the magnetomotive higher harmonic of the stator.

(e) An interaction between a thirteenth spatial higher harmonic of the magnetomotive higher harmonic of the rotor and the thirteenth spatial higher harmonic of the magnetomotive higher harmonic of the stator.

(f) An interaction between the eleventh and thirteenth spatial higher harmonics of the magnetomotive higher harmonic of the rotor and a twelfth spatial higher harmonic of a stator slot higher harmonic.

Computation on the magnetomotive higher harmonics of the rotor described above is performed using a largest magnetic pole pitch (in a surface of a rotor magnetic pole that faces the stator) of a 246-degree electrical angle and a smallest magnetic pole pitch of a 114-degree electrical angle.

As shown in FIGS. 4 through 7, the fifth, seventh, eleventh, and thirteenth spatial higher harmonic components and their phases at the magnetic pole pitches have peaks at every 360°/order, and exhibit waveforms of inverted phases.

Integrating up to 114° to 246° determines a total higher harmonic. It should be noted, however, that the computation is made based on an assumption that the higher harmonic is sinusoidal, and the time-dependent phases are involved in the computation. The computation results are shown in Table 1 below.

TABLE 1

Rotor Magnetomotive Force Higher Harmonics

| | Magnitude (Relative value) | Phase |
|---|---|---|
| 5th higher harmonic | 0.105 | 357.5° |
| 7th higher harmonic | 0.106 | 356.5° |
| 11th higher harmonic | 0.0092 | 174.5° |
| 13th higher harmonic | 0.042 | 353.5° |

Figure 8:
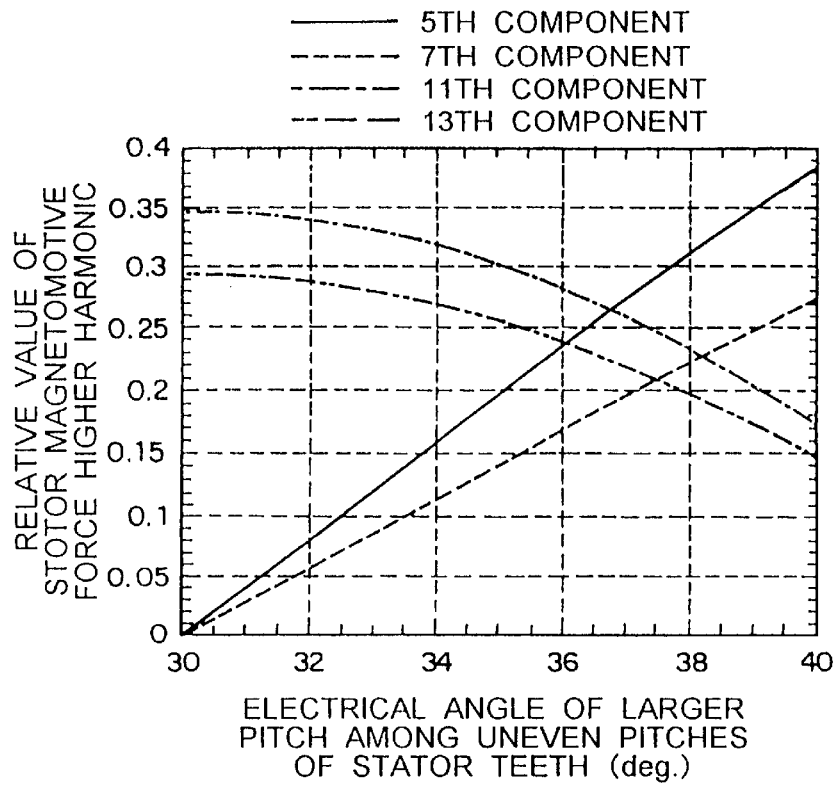
FIG. 8 is a diagram showing changes in each ordinal higher harmonic component of a magnetomotive force of a stator.

In the stator magnetomotive force higher harmonics, a current phase of each phase depends on the slot opening pitch. Hence, higher harmonics shown in FIG. 8 are produced, which is based on the stator magnetomotive force higher harmonics produced in the case of the slot openings with irregular pitches.

A direction of the stator magnetomotive force higher harmonics and a direction of the rotor magnetomotive force higher harmonics are opposite from each other; therefore, the fifth or seventh higher harmonic of the stator and that of the rotor produce stationary waves. In some cases, however, a sixth electromagnetic force produced by the fifth higher harmonics and a sixth electromagnetic exciting force produced by the seventh higher harmonics may counterbalance each other, so that phases must be taken into account when making a combination.

Figure 9:
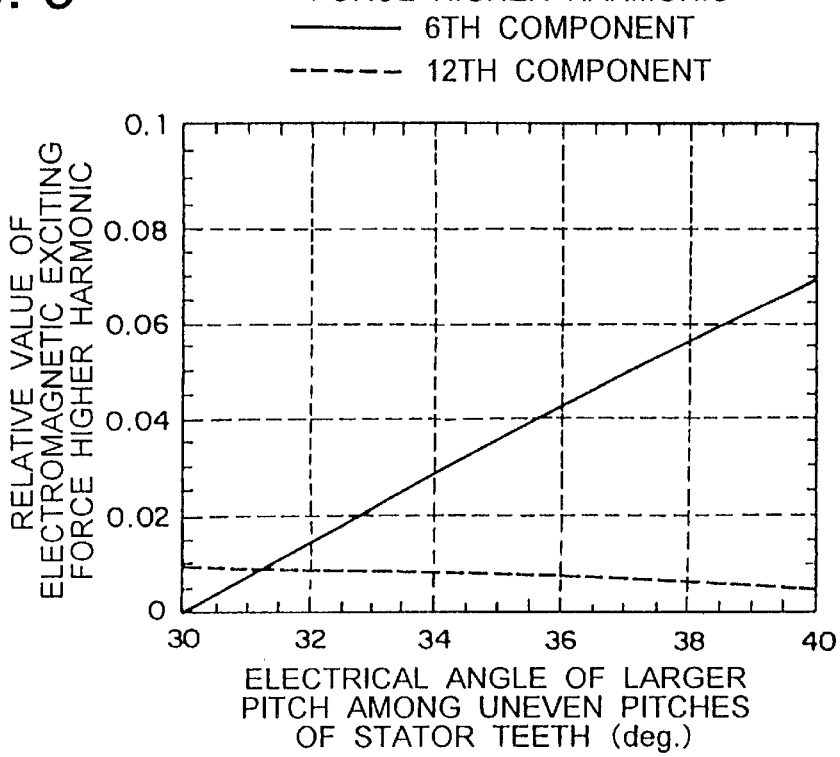
FIG. 9 is a diagram showing changes in electromagnetic exciting force higher harmonics.

FIG. 9 shows relative values of the sixth electromagnetic exciting force and the twelfth electromagnetic exciting force that can be computed from the results shown above.

Referring to the chart of FIG. 9, the sixth electromagnetic exciting force becomes the smallest at equal pitches of 30 degrees and proportionally increases as the pitch is increased. The twelfth electromagnetic exciting force becomes the largest at equal pitches of 30 degrees and decreases in inverse proportion as the pitch is increased. It can be understood that a crossing point of the electromagnetic exciting force is approximately 31 degrees.

Thus, slightly shifting the electrical angle phase difference of the three-phase stator windings reduces the twelfth electromagnetic exciting force responsible for unpleasant higher harmonic noises, although the sixth electromagnetic exciting force is increased.

Regarding the wind noises, the irregular pitches of the slot openings will reduce a 12f component, i.e., a 96th component of a rotational order ratio of the alternator. Table 2 shows data regarding the 96th component of a wind noise of the rotor 7 of the embodiment with sixteen magnetic poles produced at a 5000-rpm rotational speed of the alternator. The data is based on values calculated by subjecting major ordinal components in a range of mechanical angles from (3.75°—3.75°) to (4.5°–3.0°) of the slot openings of the irregular pitches, which corresponds to a range of phase difference in electrical angle of 30 to 36 degrees, to discrete Fourier transform to obtain frequency characteristics.

Figure 13:
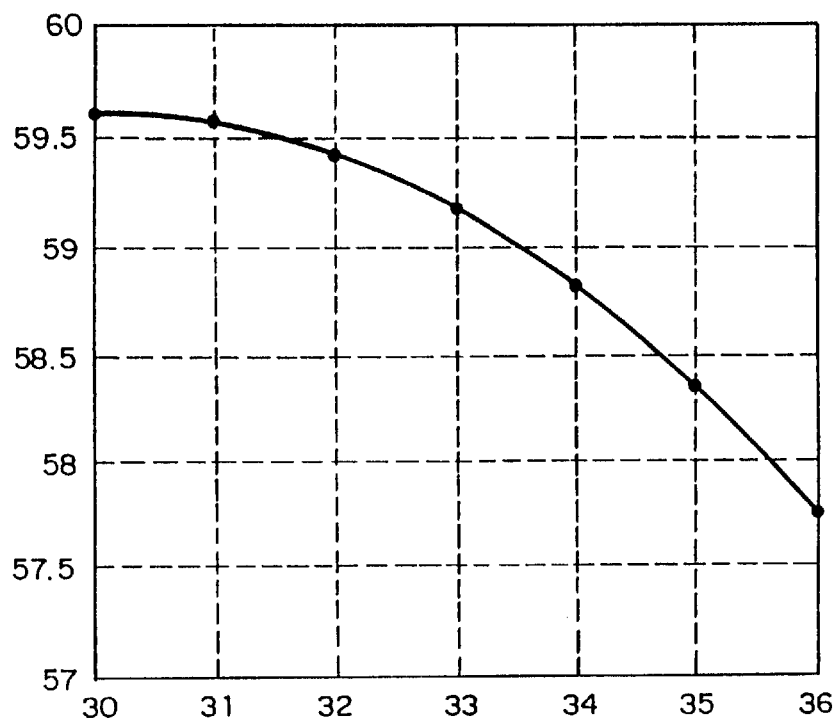
FIG. 13 is a diagram showing a relationship between an electrical angle phase difference and 96th component of wind noise.
Figure 14:
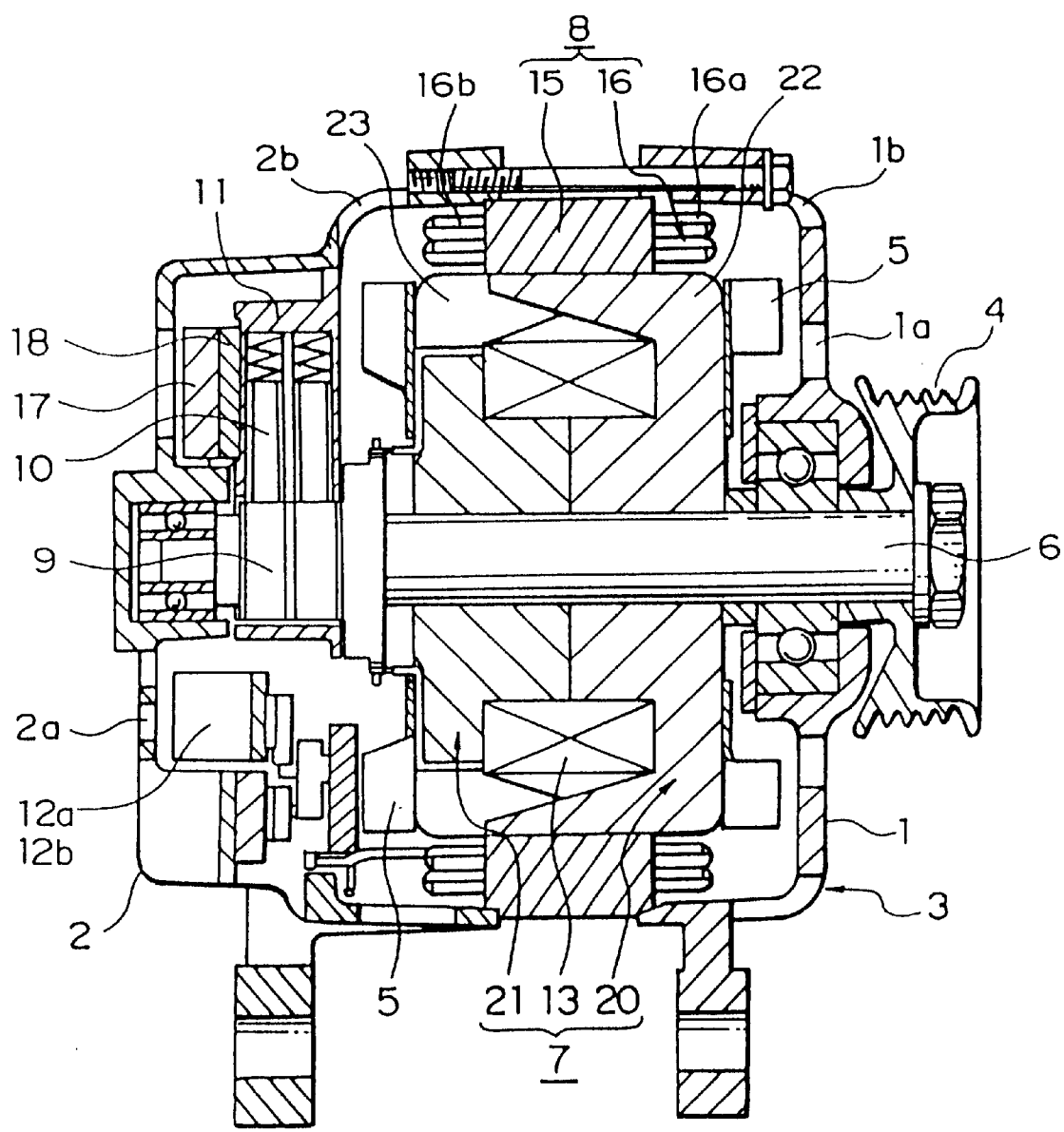
FIG. 14 is a sectional view of a conventional automotive alternator.
Figure 15:
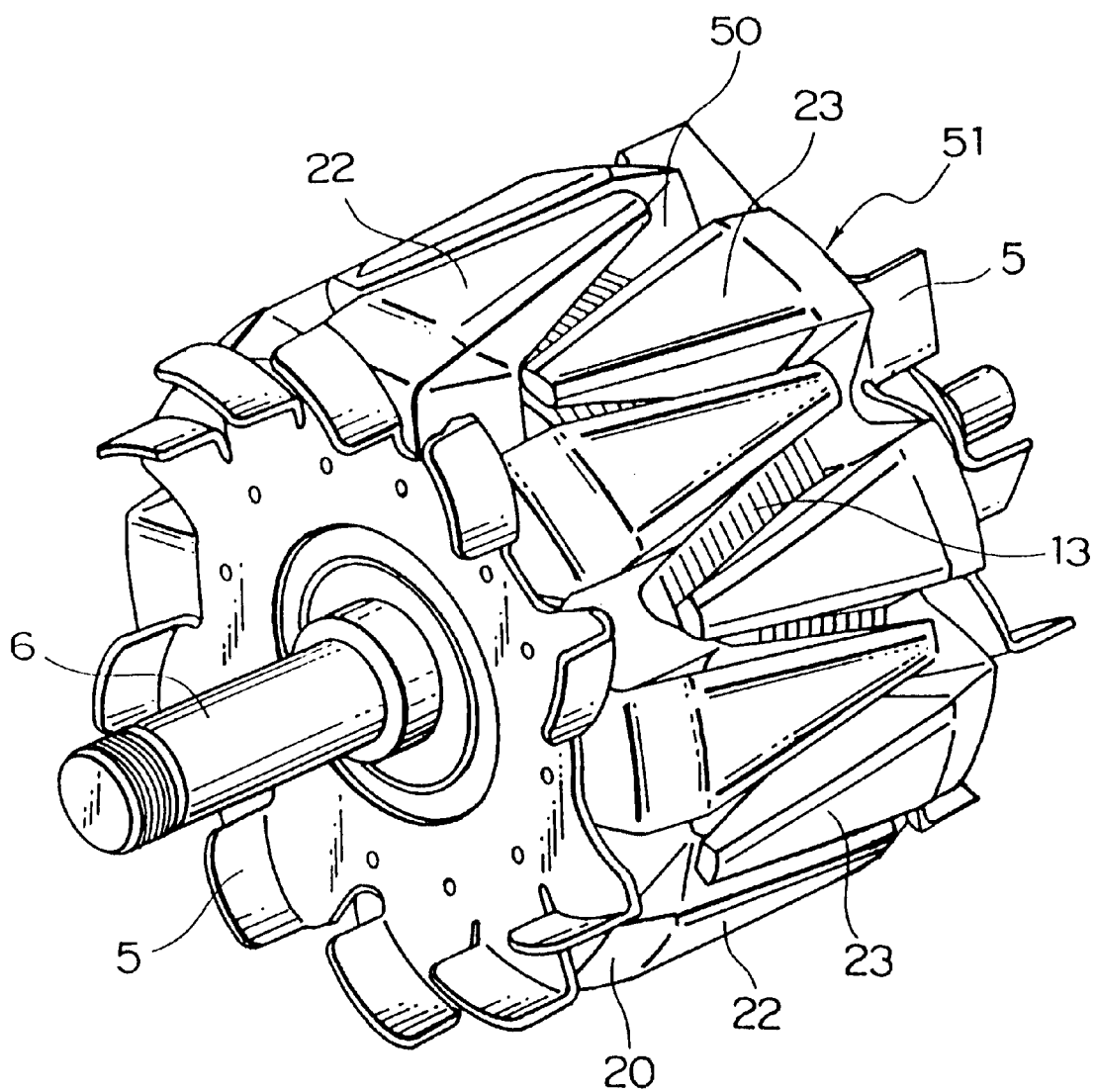
FIG. 15 is a perspective view of a rotor of FIG. 14.
Figure 16:
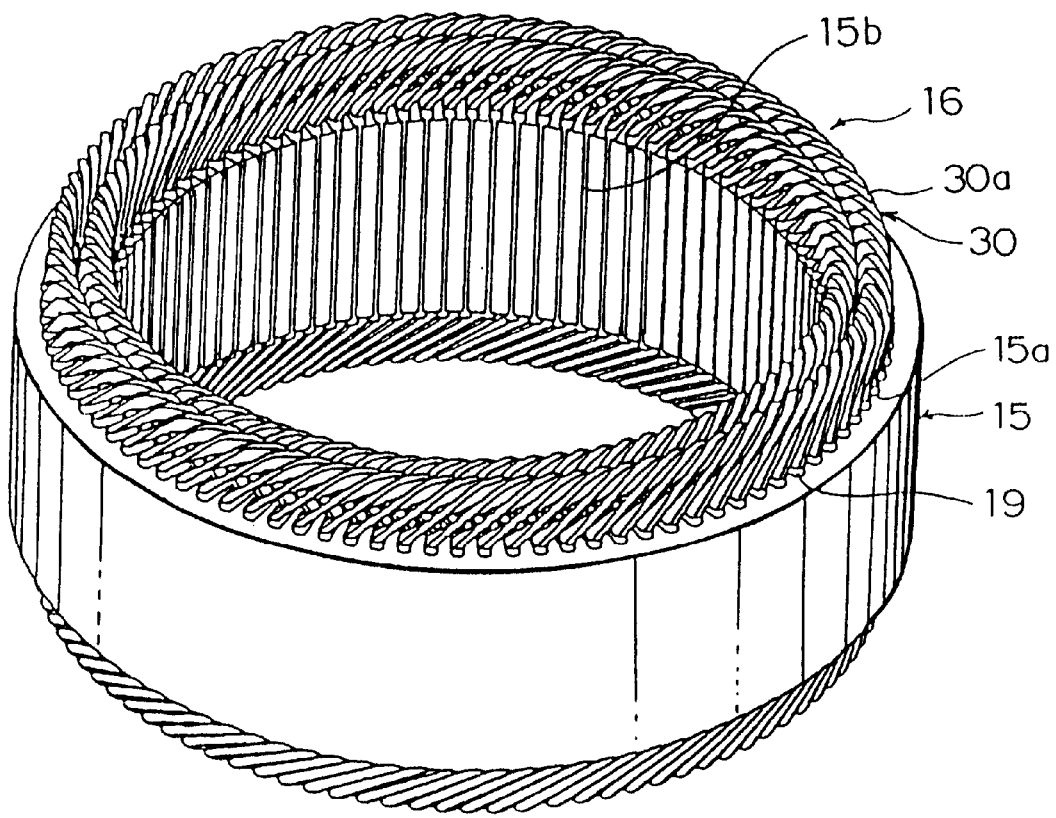
FIG. 16 is a perspective view of a stator of FIG. 14.
Figure 17:
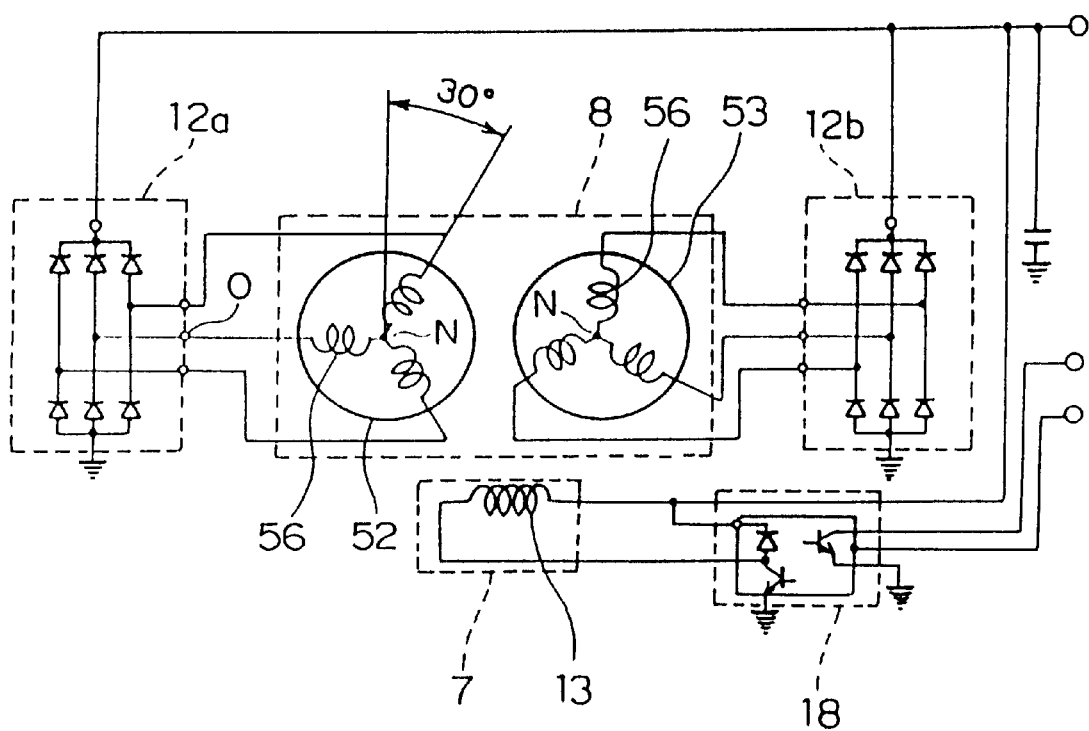
FIG. 17 is an electrical circuit diagram of the automotive alternator of FIG. 14.
Figure 18:
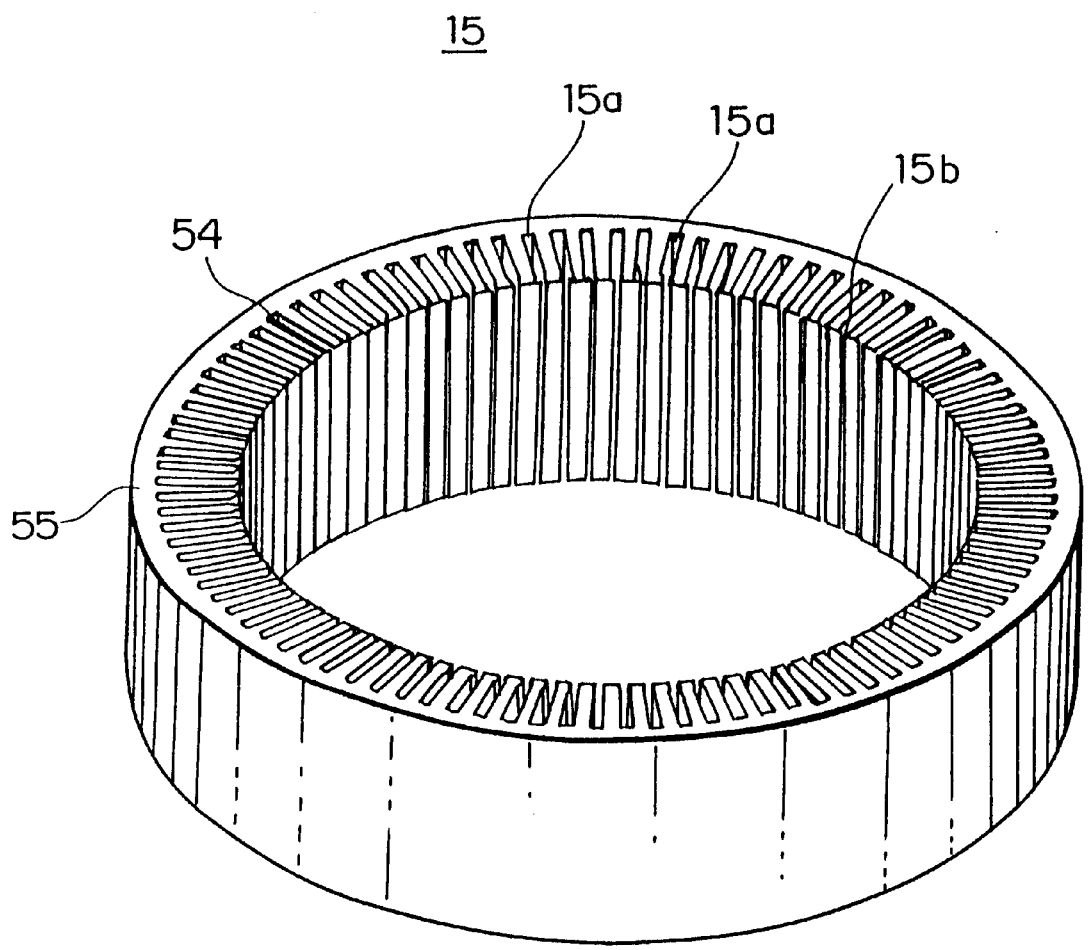
FIG. 18 is a perspective view of a stator core of FIG. 14.
Figure 19:
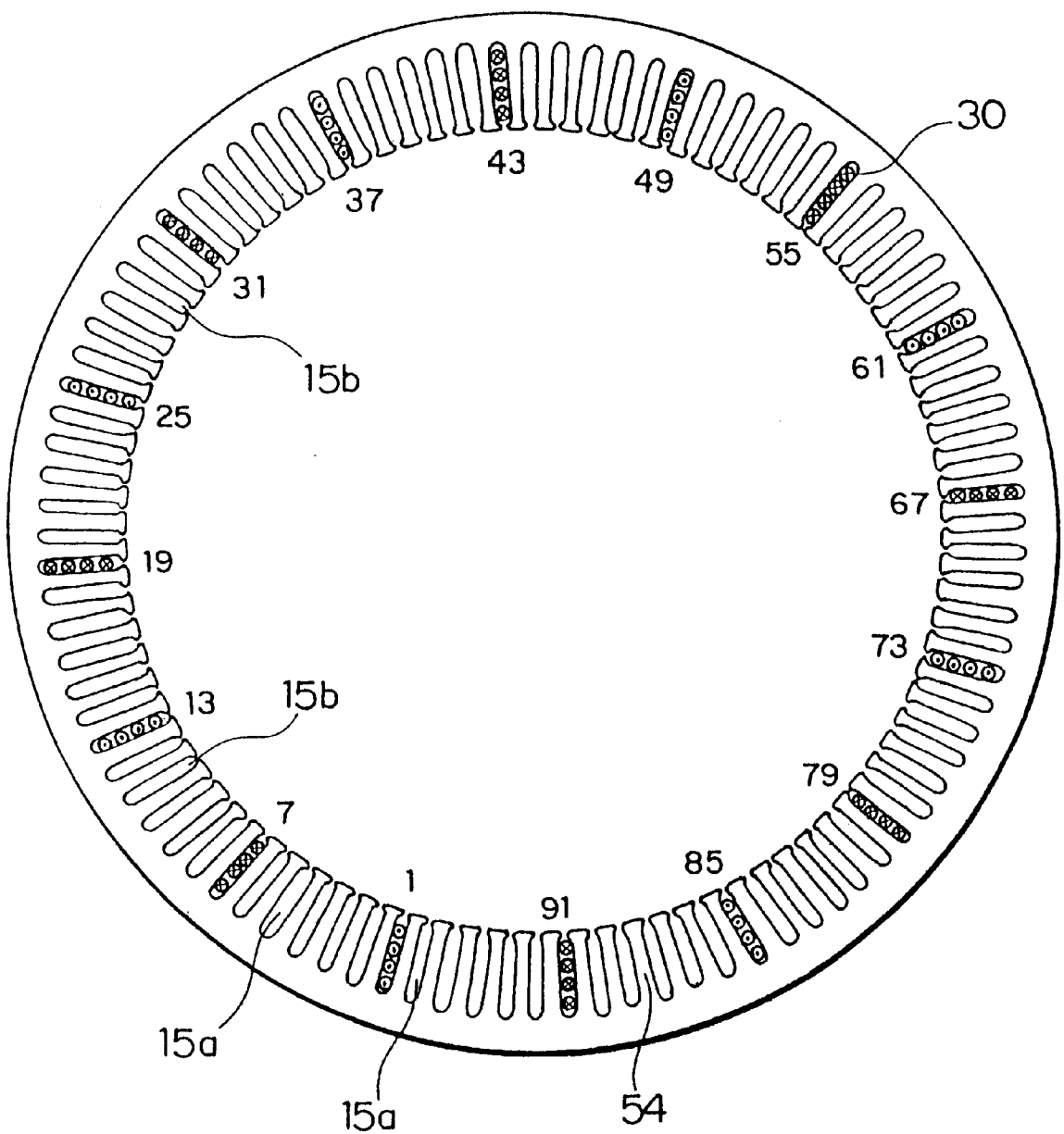
FIG. 19 is a diagram showing a winding structure of a stator winding assembly of one phase of the stator winding shown in FIG. 14.

FIG. 13 shows plotted 96th wind noise component values in a frequency range that is regarded to pose a problem in a range of idling to normal speed of the engine when the phase difference in electrical angle lies in a range of 30 to 36 degrees. It is understood that the 96th wind noise component is scattered to components of other orders, so that the 96th component decreases as the phase difference increases, a peak thereof being at a phase difference of a 30-degree electrical angle at equal pitches.

TABLE 2

| Electrical angle phase difference (degree) | Mechanical angle (degree) | Order | | |
|---|---|---|---|---|
| | | 48th | 96th | 144th |
| 30 | 3.75–3.75 | 13.42 | 59.62 | 12.53 |
| 31 | 3.875–3.625 | 34.26 | 59.57 | 4.3 |
| 32 | 4.0–3.5 | 40.28 | 59.43 | 49.22 |
| 33 | 4.125–3.375 | 43.77 | 59.18 | 52.56 |
| 34 | 4.25–3.25 | 46.24 | 58.82 | 54.8 |
| 35 | 4.375–3.125 | 48.12 | 58.34 | 56.39 |
| 36 | 4.5–3.0 | 49.67 | 57.76 | 57.56 |

On the other hand, if wide teeth and narrow teeth are alternately formed to make the slot opening pitches irregular, and especially if the pitches are made extremely irregular, then magnetic saturation undesirably takes place in the narrow teeth, resulting in a reduced amount of magnetic flux supplied to the narrow teeth from the claw-shaped magnetic poles. This causes output to be reduced particularly at low speed (idling mode) at which the rotor 60 runs at 2000 rpm. Furthermore, in the case of three-phase connection combined with full-wave rectification, an output of the first three-phase stator winding and an output of the second three-phase stator winding are balanced and output surges are reduced when the phase difference is a 30-degree electrical angle. This means that output surges increase as the phase difference increases.

Figure 10:
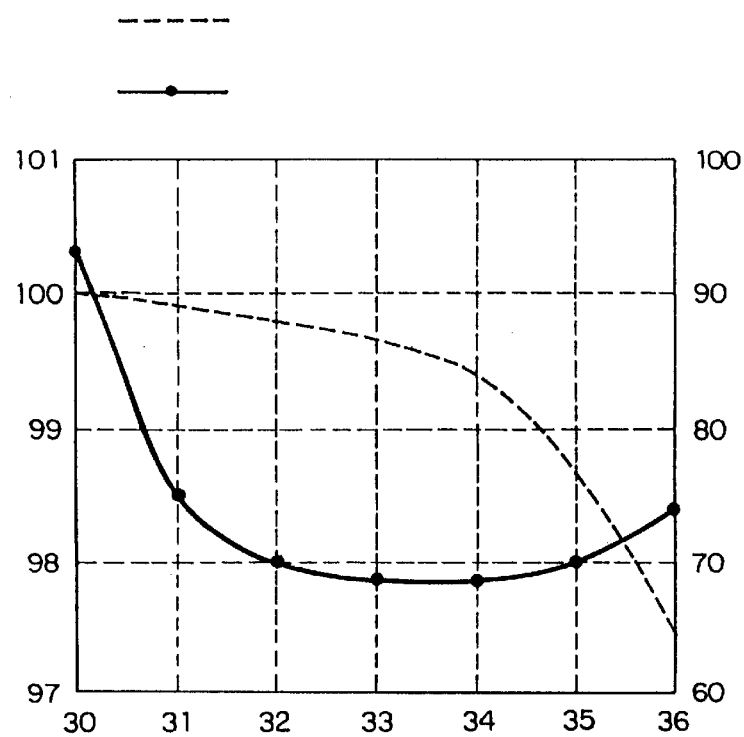
FIG. 10 is a diagram showing a relationship between an electrical angle phase difference of a three-phase stator winding, low speed output, and noise level.

FIG. 10 is a diagram illustrating a relationship between electrical angle phase difference between the first three-phase stator winding and the second three-phase stator winding, low-speed output, and noise level during power generation. The relationship has been experimentally obtained by the inventor of the application concerned, using a 100A-class automotive alternator.

From the chart, it can be seen that the noise level is low and the low-speed output is high when a phase difference in terms of electrical angle of the three-phase stator windings ranges from 31 to 34 degrees. When manufacturing errors of the stator slots are taken into account, an electrical angle phase difference of 32.5 degrees, which is a central value, is the best.

In the automotive alternator according to First Embodiment set forth above, the phase difference of electrical angle between the first three-phase stator winding 52 and the second three-phase stator winding 53 is set to 32.5 degrees by setting the slot openings O1 and O2 at irregular pitches. This arrangement reduces the 12f electromagnetic exciting force, that is, the electromagnetic noise attributable to the 96th component of the rotational order ratio, which is extremely unpleasant to the ears. Moreover, since circumferential widths X1 and X2 of the flanges 73 at the distal ends of the adjoining teeth 65a and 65b are irregular, pressure fluctuation in a gap between the stator 63 and the rotor 60 is scattered, making it possible to reduce the 96th wind noise component of the rotational order ratio that is generated in the gap. Hence, mutual interference between the electromagnetic noise and the 96th wind noise component is accordingly reduced, so that the level of noises generated by the alternator is also reduced, suppressing the noises annoying the passengers. However, if the electrical angle phase difference exceeds 34 degrees, components of other orders excessively increase although their contribution to the noise level is small, leading to an increased noise level.

In order to form the irregular pitches of the slots 61a, the circumferential widths X1 and X2 of the flanges 73 of the adjacent teeth 65a and 65b are made irregular, and the wide flanges 73 and the narrow flanges 73 are alternately formed. Reduction in output caused by magnetic saturation at the narrow flanges 73 in a low-speed range is suppressed.

Furthermore, the chamfered portions 62 formed at the proximal ends of the side surfaces in the rotational direction of the respective claw-shaped magnetic poles 22 and 23 minimize pressure fluctuation in the gap between the rotor 60 and the stator 63, thereby making it possible to reduce the 96th component of the rotational order ratio of the wind noise that is generated in the gap.

The neutral points N of the first three-phase stator winding 52 and the second three-phase stator winding 53 are electrically connected to the rectifiers 12a and 12b, respectively. Therefore, when the alternator is running at high speed, output can be taken out from voltages at the neutral points, permitting more output to be obtained without increasing a noise level.

The first rectifier 12a is electrically connected to the first three-phase stator winding 52, while the second rectifier 12b is electrically connected to the second three-phase stator winding 53, and the outputs of the two windings are combined after they are rectified. This arrangement enables stable outputs without causing the outputs of the two three-phase stator windings 52 and 53 to affect each other. The resultant outputs are large, which is particularly useful for a case wherein only one rectifier is used and a temperature of a diode constituting the rectifier exceeds a permissible temperature.

In this embodiment, the chamfered portions 62 are provided at the proximal ends of the side surfaces at the front with respect to the rotational direction; alternatively, however, they may be provided at the proximal ends of side surfaces at the rear with respect to the rotational direction. In this case, the magnetic flux in the gap will be evenly distributed, so that the magnetic flux generated from the field winding 13 will exhibit a nearly ideal sinusoidal wave, leading to an increased amount of magnetic flux, with resultant higher output at low-speed range.

Second Embodiment

Figure 11:
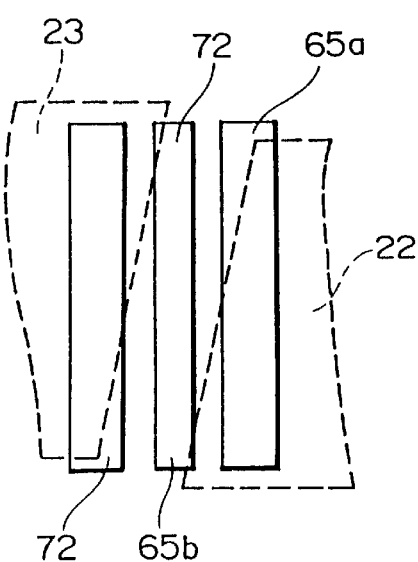
FIG. 11 is a diagram showing a positional relationship between teeth and claw-shaped magnetic poles of an automotive alternator according to Second Embodiment of the present invention.

FIG. 11 is an explanatory diagram of a stator core 71 of an automotive alternator according to Second Embodiment of the present invention.

This embodiment is different from First Embodiment in that the circumferential widths of flanges 72 at distal ends of teeth 65a and 65b are set so that the flanges 72 at both axial ends of the teeth 65a and 65b installed between adjoining claw-shaped magnetic poles 22 and 23 overlap proximal ends 22a and 23a of the claw-shaped magnetic poles 22 and 23, as observed from a radial direction. The rest of a construction of Second Embodiment is the same as the construction of First Embodiment.

In Second Embodiment, both claw-shaped magnetic poles 22 and 23 always overlap a part of the flanges 72 of the teeth 65a and 65b, as observed from the radial direction during an output. With this arrangement, pressure fluctuation in a gap between a rotor 60 and the stator core 71 can be minimized, and the 96th wind noise component of the rotational order ratio that is generated in the gap can be reduced accordingly.

Moreover, sudden variations in magnetic flux density in the gap are reduced, permitting electromagnetic noises to be reduced.

Third Embodiment

Figure 12:
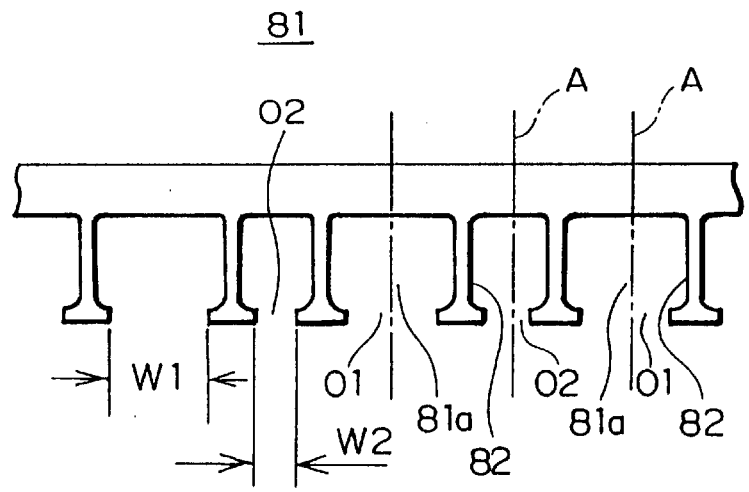
FIG. 12 is a diagram illustrating, in a flattened fashion, an essential section of a stator core of an automotive alternator in accordance with Third Embodiment of the present invention.

FIG. 12 is a diagram illustrating, in a flattened fashion, a stator core 81 of an automotive alternator in accordance with Third Embodiment of the present invention.

Third Embodiment is different from First Embodiment in that circumferential widths W1 and W2 of openings O1 and O2 of adjoining slots 81 a are irregular, while circumferential widths of distal ends of teeth 82 are regular. The rest of a construction of Third Embodiment, including irregular intervals between centerlines A of the openings O1 and O2, is identical to the construction of First Embodiment.

In Third Embodiment, since the circumferential widths W1 and W2 of the openings O1 and O2 of the slots 81a are irregular, pressure fluctuation in a gap between a rotor 60 and the stator core 81 is scattered, making it possible to reduce the 96th wind noise component of the rotational order ratio that is generated in the gap.

In the above embodiments, the descriptions have been given of the automotive alternator that has a total of 96 slots and a total of 16 claw-shaped magnetic poles. Obviously, however, the present invention can also be applied, for example, to an automotive alternator that has a total of 72 slots and a total of 12 claw-shaped magnetic poles, or an automotive alternator that has a total of 120 slots and a total of 20 claw-shaped magnetic poles.

Furthermore, in the above embodiments, the windings are formed of the conductor 30, which is a continuous wire; however, the windings may alternatively be composed by connecting numerous "U-shaped" conductor segments.

In the embodiments, the field winding 13 is included in the rotor 7. The present invention, however, can be also applied to a type of alternator in which a field winding is secured to a case, and magnetic flux is supplied to a pole core of a rotor via an air gap to form a magnetic pole. It is also obvious that an application of the present invention is not limited to automotive alternators.

As described above, in the alternator according to one aspect of the present invention, spaces between centerlines extending in a radial direction of openings of adjoining ones of the slots are irregularly formed, and the first three-phase stator winding and the second three-phase stator winding are wound around the stator core with a phase difference of an electrical angle of 31 to 34 degrees. Thus, the alternator in accordance with the present invention makes it possible to reduce electromagnetic noises and wind noises of the 12f component, which is an extremely unpleasant higher harmonic noise to the ears, thereby permitting reduced uncomfortable noises. In addition, a drop in output caused by a phase difference can be reduced.

Moreover, according to one form of the alternator, a circumferential width of a tooth may be set such that both ends of a tooth located between adjoining claw-shaped magnetic poles overlap proximal ends of the two claw-shaped magnetic poles, as observed from a radial direction. Thus, pressure fluctuation in the gap between the rotor and the stator is minimized, and the 12f component of a wind noise, which is an extremely unpleasant higher harmonic noise produced in the gap, can be reduced accordingly.

The 12f component of an electromagnetic noise, which is an extremely unpleasant higher harmonic noise, can be also reduced.

Moreover, according to another form of the alternator, side surfaces of the claw-shaped magnetic poles may have chamfered portions. Thus, the alternator in accordance with the invention features less pressure fluctuation in the gap between the rotor and the stator, enabling the 12f component of the wind noise generated in the gap to be reduced. Moreover, the magnetic flux in the gap will be evenly distributed so that the magnetic flux generated from the field winding will exhibit a nearly ideal sinusoidal wave, leading to an increased amount of magnetic flux, with resultant higher output at low-speed range.

Moreover, according to still another form of the alternator, the three-phase stator windings may have star connections, and neutral points of the star connections may be electrically connected to rectifiers for rectifying ac output. Thus, the alternator according to the invention allows output to be taken out from voltage at the neutral points when the alternator is running at high speed, so that higher output can be achieved without affecting a noise level.

Moreover, according to still another form of the alternator, circumferential widths of the openings of the slots may be regular, while circumferential widths of distal ends of adjoining teeth may be irregular. Thus, pressure fluctuation in the gap between the stator and the rotor is scattered, so that the 12f component of wind noises that is an extremely unpleasant higher harmonic noise to the ears is reduced.

Moreover, according to still another form of the alternator, circumferential widths of the openings of adjoining ones of the slots may be irregular, while circumferential widths of distal ends of the teeth may be regular. Thus, pressure fluctuation in the gap between the stator and the rotor is scattered, so that the 12f component of wind noises that is an extremely unpleasant higher harmonic noise to the ears is reduced.

Moreover, according to still another form of the alternator, the first three-phase stator winding and the second three-phase stator winding may be wound around the stator core with a phase difference of a 32.5-degree electrical angle. Thus, even if slot pitches have some manufacturing errors, electromagnetic noises and wind noises of the 12f component, which are extremely uncomfortable higher harmonic noises, can be securely reduced, and a drop in output attributable to a phase difference can also be securely suppressed.

What is claimed is:

1. An alternator, comprising:
   a stator having a stator core in which a plurality of slots are formed on an inner periphery thereof by teeth extending in an axial direction, and first and second three-phase stator windings installed in the slots;
   a rotor rotatably provided inside the stator and having a field winding that generates magnetic flux by passing an electric current, and a pole core which covers the field winding and has a plurality of claw-shaped magnetic poles; and
   a number of the slots being two per pole per phase;
   wherein distances between adjacent centerlines extending in a radial direction of openings of the slots are irregularly formed, and a first three-phase stator winding and a second three-phase stator winding are wound around the stator core with a phase difference of an electrical angle of 31 to 34 degrees.

2. The alternator according to claim 1, wherein a circumferential width of a tooth is set such that both ends of a tooth located between adjoining claw-shaped magnetic poles overlap proximal ends of the two claw-shaped magnetic poles, as observed from a radial direction.

3. The alternator according to claim 1, wherein side surfaces of the claw-shaped magnetic poles have chamfered portions.

4. The alternator according to claim 1, wherein the three-phase stator windings have star connections, and neutral points of the star connections are electrically connected to rectifiers for rectifying ac output.

5. The alternator according to claim 1, wherein circumferential widths of the openings of the slots are regular, while circumferential widths of distal ends of adjoining teeth are irregular.

6. The alternator according to claim 1, wherein circumferential widths of the openings of adjoining ones of the slots are irregular, while circumferential widths of distal ends of the teeth are regular.

7. The alternator according to claim 1, wherein the first three-phase stator winding and the second three-phase stator winding are wound around the stator core with a phase difference of a 32.5-degree electrical angle.

* * * * *